United States Patent Office 3,027,230
Patented Mar. 27, 1962

3,027,230
PRODUCTION OF ALKALI METAL
ZIRCONIUM SILICATES
Harry Kloepfer, Artur Frey, Eugen Meyer-Simon, and Robert Schrauf, Frankfurt am Main, Germany, assignors to Deutsche Gold- und Silber-Scheideanstalt vormals Roessler, Frankfurt am Main, Germany
No Drawing. Filed Aug. 1, 1960, Ser. No. 46,367
Claims priority, application Germany Aug. 1, 1959
7 Claims. (Cl. 23—110)

This invention relates to the production of zirconium silicates, and more particularly to the production of alkali metal zirconium silicates.

The art is aware that alkali metal zirconium silicates can be made by fusing or sintering zirconium silicate with alkali metal hydroxides or carbonates.

According to the present invention and contrary to previous teaching alkali metal zirconium silicates can be obtained by treating zirconium silicate with alkali metal hydroxides in the presence of water at an elevated temperature and under increased pressure; sodium hydroxide is particularly suitable for this new process.

According to the invention the starting material can be pure zirconium silicate, $ZrSiO_4$. This reacts with the aqueous alkali metal hydroxide, e.g. aqueous sodium hydroxide, to form the alkali metal zirconium silicate, e.g. sodium zirconium silicate, $Na_2ZrSiO_5$. Instead of pure zirconium silicate, naturally occurring siliceous zirconium minerals can be used, whether or not they are stoichiometric compounds and regardless of any impurities they may contain.

In practising the invention it has been found that the best results are obtained if the reaction takes place at temperatures above 170° C., preferably above 200° C. From the technical point of view, temperatures above 500° C., however, are of no interest. Since at these temperatures the pressure of the water vapor considerably exceeds the atmospheric pressure, the reaction is carried out in an autoclave.

As a general rule, coarse-grained starting material requires a higher reaction temperature than finely divided material. The reaction is usually completed within a few hours, the length of time required depending on the temperature and on the texture of the material.

In practising the invention it has been further found that the best results are obtained with 30 to 75% by weight aqueous solutions of alkali metal hydroxides; it is preferable to use 60% by weight solutions.

A complete conversion is attained if excess alkali metal hydroxide is employed, preferably from 4 to 6 mols for each mol of zirconium silicate. After the conversion is completed the reaction mixture is diluted with water. The pure alkali metal zirconium silicate is separated by filtration. It is substantially free of impurities. The filtrate may be concentrated and recycled, supplemented by fresh alkali metal hydroxide.

It is one of the features of the invention that the reaction products are contaminant-free. Neither zirconium dioxide nor sodium zirconate nor alkali metal silicate are formed during the reaction.

The alkali metal zirconium silicates made according to the invention may be transformed into other salts, in a manner known in the art, by treatment with inorganic acids such as sulfuric acid, hydrochloric acid or nitric acid, or with an organic acid such as tartaric acid.

The following examples are provided as illustrative of some of these results obtainable in the practice of certain embodiments of this invention. It is to be understood that the examples are by no means exhaustive of all aspects of the invention in its broadest scope.

Example 1

To a 60% by weight solution of sodium hydroxide, prepared by dissolving 1020 grams of sodium hydroxide in 680 ml. of water, are added 750 grams of zirconium silicate (ca. 75% with a particle size below 40μ) containing 66% of zirconium dioxide. The mixture is transferred to an alkali-resistant autoclave, heated to 275 to 280° C., kept at this temperature and stirred for a period of five hours. After cooling to about 90° C. the mixture is diluted with water, filtered and washed. The yield is 1000 grams of white sodium zirconium silicate which is 98% of the theory.

Formula: $Na_2O \cdot ZrO_2 \cdot SiO_2$

The washing waters are concentrated to give a 60% by weight solution of sodium hydroxide. It may be reused after replacing the spent alkali.

Example 2

To a solution of 198 grams of sodium hydroxide in 248 ml. of water are added 200 grams of zirconium silicate (with a particle size below 5μ) containing 59.4% of zirconium oxide. After heating for three hours in an autoclave at 225° C., the reaction mixture is diluted, filtered and washed with hot water. After decomposition of the sodium zirconium silicate with sulfuric acid, 102 grams of zirconium dioxide corresponding to 203 grams of sodium zirconium silicate are obtained. This yield is 86% of the theory.

Example 3

To a solution of 1110 grams of sodium hydroxide in 735 ml. of water are added 750 grams of zirconium silicate (with a particle size below 5μ) containing 59.4% of zirconium dioxide. After heating for five hours in an autoclave at 200° C. and treating the reaction product as in Example 2, 245 grams of zirconium dioxide corresponding to 490 grams of sodium zirconium silicate are obtained. This yield is 55% of the theory.

Example 4

To a solution of 750 grams of sodium hydroxide in 1125 ml. of water are added 750 grams of zirconium silicate (75% of which has a particle size below 15μ) containing 66.0% of zirconium dioxide. After heating for five hours in an autoclave at 275° C. and treating as in Examples 2 and 3, 262 grams of zirconium dioxide corresponding to 524 grams of sodium zirconium silicate are obtained. This yield is 53% of the theory.

Example 5

To a solution of 700 grams of potassium hydroxide in 350 ml. of water are added 360 g. of zirconium silicate containing 66.0% of zirconium dioxide. The mixture is stirred in an autoclave for four hours at a temperature of 300° C. After cooling the process is carried out according to Example 1. This yield is 532 grams of $K_2O \cdot ZrO_2 \cdot SiO_2$ corresponding to a yield of 99% at precipitating.

The yields of Examples 3 and 4 which appear to be low are sufficient for certain technical purposes, e.g. the preparation of blue pigments such as zirconium vanadium oxide, and for the manufacture of catalyst carriers. In both instances it suffices that only the outer layers of the particles are completely transformed by the treatment according to the invention.

We claim:

1. Process for the production of alkali metal zirconium silicates comprising the treatment of zirconium silicate with an aqueous solution of an alkali metal hydroxide at temperatures between 170 and 500° C. in an autoclave.

2. Process for the production of alkali metal zirconium silicates comprising the treatment of naturally occurring minerals containing zirconium silicate with an aqueous solution of an alkali metal hydroxide at temperatures between 170 and 500° C. in an autoclave.

3. Process for the production of alkali metal zirconium silicates comprising the treatment of zirconium silicate with an aqueous solution of sodium hydroxide at temperatures between 170 and 500° C. in an autoclave.

4. Process for the production of alkali metal zirconium silicates comprising the treatment of zirconium silicate with an aqueous solution of sodium hydroxide at temperatures between 170 and 500° C. in an autoclave, said sodium hydroxide being employed in the proportion of 4 to 6 mols to each mol of zirconium silicate.

5. Process for the production of alkali metal zirconium silicates comprising the treatment of zirconium silicate with an aqueous solution of an alkali metal hydroxide at temperatures between 170 and 500° C. in an autoclave, diluting the reaction mixture with water, separating the alkali metal zirconium silicate by filtration, washing the alkali metal zirconium silicate with water, concentrating the washing waters and re-using the resulting concentrate for the next conversion treatment after replacing the spent alkali metal hydroxide.

6. The process of claim 1 in which the concentration of the alkali metal hydroxide in said aqueous solution is 30–75% by weight.

7. The process of claim 1 in which said aqueous alkali metal hydroxide solution is an aqueous 60% by weight sodium hydroxide solution.

References Cited in the file of this patent

UNITED STATES PATENTS 2,871,138    Linnell _____ Jan. 16, 1957